(12) United States Patent
Yang et al.

(10) Patent No.: US 12,535,561 B2
(45) Date of Patent: Jan. 27, 2026

(54) METHOD FOR QUALITY DETECTION OF TUNNEL LINING THROUGH GROUND-PENETRATING RADAR BASED ON SELF-SUPERVISED LEARNING

(71) Applicant: YUNNAN AEROSPACE ENGINEERING GEOPHYSICAL DETECTING CO., LTD., Yunnan (CN)

(72) Inventors: Xi Yang, Yunnan (CN); Jian Huang, Yunnan (CN); Feng Zhou, Yunnan (CN)

(73) Assignee: YUNNAN AEROSPACE ENGINEERING GEOPHYSICAL DETECTING CO., LTD., Yunnan (CN)

( * ) Notice: Subject to any disclaimer, the term of this patent is extended or adjusted under 35 U.S.C. 154(b) by 0 days.

(21) Appl. No.: 18/267,935

(22) PCT Filed: Dec. 6, 2022

(86) PCT No.: PCT/CN2022/136945
§ 371 (c)(1),
(2) Date: Jun. 16, 2023

(87) PCT Pub. No.: WO2023/207104
PCT Pub. Date: Nov. 2, 2023

(65) Prior Publication Data
US 2025/0044412 A1    Feb. 6, 2025

(30) Foreign Application Priority Data
Apr. 26, 2022    (CN) .......................... 202210448741.0

(51) Int. Cl.
*G01S 7/41*        (2006.01)
*G01S 13/88*    (2006.01)
(Continued)

(52) U.S. Cl.
CPC ............ *G01S 7/417* (2013.01); *G01S 13/885* (2013.01); *G01S 13/89* (2013.01); *G06T 7/0004* (2013.01);
(Continued)

(58) Field of Classification Search
None
See application file for complete search history.

(56) References Cited

U.S. PATENT DOCUMENTS 8,072,367 B1 * 12/2011 Bausov ................. G01S 13/885
342/21
2008/0218400 A1 * 9/2008 Stolarczyk .............. G01S 13/34
342/22
(Continued)

FOREIGN PATENT DOCUMENTS

CN    110020652 A    7/2019
CN    111815629 A *   10/2020    ........... G06T 7/0006
(Continued)

OTHER PUBLICATIONS

Y. Wang et al, "A deep learning network to improve tunnel lining defect identification using ground penetrating radar"; Proceedings of the 11th Conference of Asian Rock Mechanics Society; IOP Conf. Series: Earth and Environmental Science; 861 (2021) 042057. (Year: 2021).*
(Continued)

*Primary Examiner* — Bernarr E Gregory
(74) *Attorney, Agent, or Firm* — CANTOR COLBURN LLP

(57) ABSTRACT

A method for a quality detection of tunnel lining through ground-penetrating radar based on self-supervised learning. In the method, a grayscale image of the tunnel to be detected is obtained, the grayscale image is then input into a trained feature recognition model, to obtain a feature atlas is cor-
(Continued)

responding to the grayscale image, and then a quality recognition result of the tunnel to be detected is determined according to the feature atlas. In the present application, the feature recognition model is obtained by means of the self-supervised learning according to an unlabeled image set and a labeled image set, and the unlabeled image set is directly utilized to train the recognition model, which not only improves the efficiency of training the tunnel recognition model, but also improves the accuracy of tunnel quality detection results.

18 Claims, 5 Drawing Sheets

(51) Int. Cl.
*G01S 13/89* (2006.01)
*G06T 7/00* (2017.01)

(52) U.S. Cl.
CPC ............ *G06T 2207/10044* (2013.01); *G06T 2207/20081* (2013.01); *G06T 2207/20084* (2013.01)

(56) References Cited

U.S. PATENT DOCUMENTS

| | | | | |
|---|---|---|---|---|
| 2009/0040093 | A1* | 2/2009 | Holly | F41H 11/136 342/22 |
| 2009/0278725 | A1* | 11/2009 | Greegor | G01S 13/885 342/191 |
| 2012/0229321 | A1* | 9/2012 | Holly | G01S 13/885 342/22 |
| 2013/0113646 | A1* | 5/2013 | Allouche | G01S 13/885 342/21 |
| 2016/0097879 | A1* | 4/2016 | Stolarczyk | G01S 13/89 342/22 |
| 2021/0263143 | A1 | 8/2021 | Kawato et al. | |

FOREIGN PATENT DOCUMENTS

| | | | |
|---|---|---|---|
| CN | 114078237 A | 2/2022 | |
| CN | 114359656 A | 4/2022 | |
| CN | 114548278 A * | 5/2022 | ............... G06N 3/08 |
| CN | 114707532 A * | 7/2022 | ............... G06K 9/00 |
| CN | 114897804 A | 8/2022 | |
| CN | 114942436 A * | 8/2022 | ............. G01S 13/88 |
| JP | 2020003379 A | 1/2020 | |

OTHER PUBLICATIONS

C. Li, L. Cai, L. Guo and D. Chen, "Research on Target Recognition Method of Tunnel Lining Image Based on Deep Learning," 2022 IEEE 6th Information Technology and Mechatronics Engineering Conference (ITOEC), Chongqing, China, 2022, pp. 1833-1837; published Mar. 4, 2022. (Year: 2022).*
S. Yang et al., "Defect Segmentation: Mapping tunnel lining internal defects with ground penetrating radar data using a convolutional neural network"; published in "Construction and Building Materials"; 319 (2022) 125658; available online Dec. 21, 2021. (Year: 2021).*
C. Xu, H. Yao, J. Yu and X. Bai, "DSLCD-based Tunnel Secondary Lining Cavities Detection in Ground Penetrating Radar Images," 2022 International Conference on Computer Network, Electronic and Automation (ICCNEA), Xi'an, China, 2022, pp. 149-153; published Sep. 1, 2022. (Year: 2022).*
L. Guo, L. Cai and D. Chen, "Research on tunnel lining image target recognition method based on YOLOv3," 2022 IEEE 10th Joint International Information Technology and Artificial Intelligence Conference (ITAIC), Chongqing, China, 2022, pp. 1800-1805; published Jun. 17, 2022. (Year: 2022).*
A. Fetterman et al.; "Understanding self-supervised and contrastive learning with 'Bootstrap Your Own Latent' (BYOL)"; dated Aug. 24, 2020; posted on the Internet at imbue.com. (Year: 2020).*
International Search Report dated Feb. 21, 2023; International Application No. PCT/CN2022/136945; 3 pages (non-English).
Qin, H. et al. "Automatic recognition of tunnel lining elements from GPR images using deep convolutional networks with data augmentation", Automation in Construction 130 (2021), 14 pages.
Wang, J. et al. "Arbitrarily-oriented tunnel lining defects detection from Ground" Automation in Construction 133 (2022), 14 pages.

* cited by examiner

METHOD FOR QUALITY DETECTION OF TUNNEL LINING THROUGH GROUND-PENETRATING RADAR BASED ON SELF-SUPERVISED LEARNING

CROSS-REFERENCE TO RELATED APPLICATIONS

This application is the national phase entry of International Application No. PCT/CN2022/136945, filed on Dec. 6, 2022, which is based upon and claims priority to the Chinese Patent Application No. 202210448741.0, filed on Apr. 26, 2022, the entire contents each of which are incorporated herein by reference.

TECHNICAL FIELD

The present application relates to the field of tunnel lining quality detection technologies, and in particular, to a method for a quality detection of tunnel lining through ground-penetrating radar based on self-supervised learning.

BACKGROUND

Tunnel lining plays the role of bearing a pressure from surrounding rocks, a dead weight of structure and preventing the surrounding rocks from weathering during an operation of the tunnel. Due to the factors such as irregular construction, untimely maintenance and changes in geological environment over time, to continuously guarantee the quality and safety of tunnel lining may be difficult. In addition to the defects (such as, surface concrete cracks, falling off) visible to the naked eye on the outer surface of the lining, problems such as missing steel bars, excessive steel bar spacing, substandard thickness, and voids are often existed inside the tunnel lining. Therefore, a regular detection of quality and health state of the tunnel lining structure is of great significance to the safe operation of tunnel. Currently, the most important method for non-destructive detection of tunnel lining quality is the ground-penetrating radar (GPR) method, which has the advantages of high detection efficiency and convenient operation.

With the rise of artificial intelligence deep learning technology, especially the convolutional neural network (CNN) method, the research of deep learning technology in the ground-penetrating radar image recognition and the target detection has made rapid progress. The CNN method is able to automatically learn advanced features from training data and then estimate nonlinear mappings between input image data and various other data domains such as labels, text, or other images. Deep learning-based automatic recognition technology can eliminate data interpretation errors caused by differences in personnel experience and greatly improve the interpretation efficiency of detection data. As a method of automatic image recognition, the recognition effect of CNN-based deep learning technology is better than that of conventional computer vision methods (such as SIFTORB, etc.), With the continuous development of this technology, the CNN-based deep learning technology has shown great application potential and value in the field of GPR image automatic recognition.

Nevertheless, the CNN-based deep learning technology is a supervised learning technology, and a recognition accuracy of the CNN-based deep learning technology depends entirely on the number of learning samples and the quality of labels. Therefore, a lot of time needs to be spent to label the GPR detection images and prepare a training sample set. Even so, the number of training samples that can be obtained is still far from meeting the needs, resulting in low accuracy of conventional artificial intelligence automatic recognition methods. In addition, due to the particularity of GPR detection data, errors caused by interpreting personnel experience differences in the process of labeling detection images is still inevitably introduced. Therefore, the automatic recognition of GPR images based on CNN-based deep learning technology is still in the research and exploration stage, and there is still a long way to go from practical application. In fact, the current bottleneck in the development of supervised learning technology is that the contradiction between the huge demand for data and the time-consuming and economic cost of labeling data has not been fundamentally resolved. In response to the above problems, scholars at home and abroad have developed various methods for training sample data expansion, such as Hui Qin et al (*Automatic recognition of tunnel lining elements from GPR images using deep convolutional networks with data augmentation*. Automation in Construction2021) use adversarial network (GAN) to generate training samples, Jing Wang et al (*Arbitrarily-oriented tunnel lining defects detection from ground-penetrating radar images using deep Convolutional Neural networks*. Automation in Construction, 2022) use numerical simulation data to generate training samples. However, none of the above methods has essentially solved the problem that the training samples need to be manually labeled, and the training samples generated by the above methods are not real measurement data. The artificial intelligence network trained with such training samples to recognize the actual measurement data is bound to be substituted into errors, which reduces the recognition accuracy.

SUMMARY

The present application provides a method for a quality detection of tunnel lining through ground-penetrating radar based on self-supervised learning, which can solve the problems of low efficiency in model training and low accuracy due to the high time cost of manual labeling.

In accordance with a first aspect, an embodiment of the present application provides a method for a quality detection of tunnel lining through ground-penetrating radar based on self-supervised learning, which includes the following steps:
  obtaining a ground-penetrating radar grayscale image;
  inputting the ground-penetrating radar grayscale image into a trained convolutional neural network model to recognize the quality detection of tunnel lining, where the convolutional neural network model is constructed according to a learned feature extraction network, and the feature extraction network is obtained by means of self-supervised contrastive learning according to a training sample set, and each image sample in the training sample set is an image of unlabeled image-sample label; and
  outputting a recognition result of the quality detection of tunnel lining.

In a possible implementation of the first aspect, the method further includes the following steps:
  obtaining an image sample set, and taking the image sample set as the training sample set;
  constructing a self-supervised learning pre-training network, performing the self-supervised contrastive learning on the self-supervised learning pre-training network according to the training sample set, to generate the learned feature extraction network;

constructing the convolutional neural network model according to the learned feature extraction network;

obtaining downstream training samples having labeled data; and performing a supervised learning on the convolutional neural network model by means of the downstream training samples having labeled data, to obtain the trained convolutional neural network model.

In a possible implementation manner of the first aspect, the step of obtaining the image sample set includes the following steps:

detecting a tunnel lining structure through ground-penetrating radar equipment, to obtain raw data of a ground-penetrating radar measurement;

preprocessing the raw data of the ground-penetrating radar measurement to obtain preprocessed data of the ground-penetrating radar measurement;

processing the preprocessed data of the ground-penetrating radar measurement to obtain a ground-penetrating radar grayscale image, and taking the obtained ground-penetrating radar grayscale image as an image sample; and obtaining the image sample set based on the obtained at least one image sample.

In a possible implementation of the first aspect, the step of constructing the self-supervised learning pre-training network, and performing the self-supervised contrastive learning on the self-supervised learning pre-training network according to the training sample set, to generate the learned feature extraction network, includes the following steps:

constructing the self-supervised learning pre-training network, where the self-supervised learning pre-training network includes an online encoder, a momentum encoder and a loss calculation model;

performing a transformation process on each image sample respectively, to obtain a first view $V_{i1}$ and a second view $V_{i2}$ corresponding to the image sample;

inputting the first view $V_{i1}$ corresponding to the image sample into the online encoder respectively, to obtain a first projection feature atlas corresponding to the image sample;

inputting the second view $V_{i2}$ corresponding to the image sample into the momentum encoder respectively, to obtain a second projection feature atlas corresponding to the image sample; and obtaining a feature extraction network model by training according to the loss calculation model, the obtained first projection feature atlas corresponding to the image sample, and the obtained second projection feature atlas corresponding to the image sample.

In a possible implementation manner of the first aspect, the step of obtaining a feature extraction network model by training according to the loss calculation model, the obtained first projection feature atlas corresponding to the image sample, and the obtained second projection feature atlas corresponding to the image sample, includes the following steps:

obtaining an overall loss value L according to the first projection feature atlas corresponding to the image sample, the second projection feature atlas corresponding to the image sample, and the loss calculation model;

obtaining, based on the overall loss value L, a parameter update value $\theta_1$ of the first backbone network by means of gradient update parameter;

determining a parameter update value $\theta_2$ of the second backbone network according to a formula, $\theta_2 \leftarrow m\theta'_2 + (1-m)\theta_1$ wherein m is an update coefficient, and $\theta'_2$ is a parameter value when the second backbone network is not currently updated;

updating the first backbone network and the second backbone network;

continue training by using the next batch of image samples until the overall loss value L converges; and taking the first backbone network as the learned feature extraction network.

In a possible implementation of the first aspect, the training sample set includes an image sample $P_1$, an image sample $P_2, \ldots$, an image sample $P_n$, each of the image samples are all unlabeled grayscale images.

Correspondingly, the step of performing the transformation processing on each image sample respectively, to obtain the first view $V_{i1}$ and the second view $V_{i2}$ corresponding to the image sample includes a step of: performing the transformation processing on the image sample $P_1$ to obtain the first view $V_{i1}$ and the second view $V_{i2}$ of the image samples and the transformation processing includes a random cropping, a random flipping, a contrast adjustment, a saturation adjustment, a Gaussian blur and an insolation operation, where, i=1, 2, . . . , n.

In a possible implementation manner of the first aspect, the online encoder includes a first backbone network, a first global feature projection model, a first pixel-level local feature projection model, and a first line-level local feature projection model.

Correspondingly, the step of inputting the first view $V_{i1}$ corresponding to the image sample into the online encoder respectively, to obtain the first projection feature atlas corresponding to the image sample includes the following steps:

for the first view $V_{i1}$ of each image sample, performing a feature extraction on the first view $V_{i1}$ according to the first backbone network to obtain a first feature map $F_{i1}$;

inputting the first feature map $F_{i1}$ into the first global feature projection model to obtain a first global feature projection map $Q_g(F_{i1})$;

inputting the first feature map $F_{i1}$ into the first pixel-level local feature projection model for a pixel-level local feature projection, to obtain a first pixel-level feature projection map $Q_d(F_{i1})$;

inputting the first feature map $F_{i1}$ into the first line-level local feature projection model for a line-level local feature projection, to obtain a first line-level feature projection map $Q_r(F_{i1})$; and taking the first global feature projection map $Q_g(F_{i1})$, the first pixel-level feature projection map $Q_d(F_{i1})$, and the first line-level feature projection map $Q_r(F_{i1})$ as the first projection feature atlas corresponding to the image sample.

In a possible implementation manner of the first aspect, the first line-level local feature projection model includes a first linear feature extraction layer, a second linear feature extraction layer, and a third linear feature extraction layer.

Correspondingly, the step of inputting the first feature map $F_{i1}$ into the first line-level local feature projection model for the line-level local feature projection, to obtain the first line-level feature projection map $Q_r(F_{i1})$ includes the following steps:

dividing the first feature map $F_{i1}$ into a first linear region, a second linear region and a third linear region;

performing a feature extraction on the first linear region according to the first linear feature extraction layer to obtain a first feature vector B1;

performing a feature extraction on the second linear region according to the second linear feature extraction layer to obtain a second feature vector B2;

performing a feature extraction on the third linear region according to the third linear feature extraction layer to obtain a third feature vector B3;

determining a vector similarity Sim (B1, B2) between the first feature vector B1 and the second feature vector B2; and taking a vector product between the vector similarity Sim (B1, B2) and the third feature vector B3 as the first line-level feature projection map $Q_r(F_{i1})$ of each first feature map $F_{i1}$.

In a possible implementation manner of the first aspect, the momentum encoder includes a second backbone network, a second global feature projection model, a second pixel-level local feature projection model, and a second line-level local feature projection model.

Correspondingly, the step of inputting the second view $V_{i2}$ corresponding to the image sample into the momentum encoder respectively, to obtain the second projection feature atlas corresponding to the image sample includes the following steps:

for the second view $V_{i2}$ of each image sample, performing a feature extraction on the second view $V_{i2}$ according to the second backbone network to obtain a second feature map $F_{i2}$;

inputting the second feature map $F_{i2}$ into the second global feature projection model to obtain a second global feature projection map $K_g(F_{i2})$;

inputting the second feature map $F_{i2}$ into the second pixel-level local feature projection model for a pixel-level local feature projection to obtain a second pixel-level feature projection map $K_d(F_{i2})$;

inputting the second feature map i2 into the second line-level local feature projection model for a line-level local feature projection to obtain a second line-level feature projection map $K_r(F_{i2})$; and taking the second global feature projection map $K_g(F_{i2})$, the second pixel-level feature projection map $K_d(F_{i2})$, and the second line-level feature projection map $K_r(F_{i2})$ as the second projected feature atlas corresponding to the image sample.

In a possible implementation manner of the first aspect, the calculation formula of the loss calculation model is:

$$L = (1 - \alpha - \beta)L_g + \alpha L_d + \beta L_r$$

where, L represents an overall loss value, $L_g$ represents a global loss value obtained by comparing the first global feature projection map $Q_g(F_{i1})$ and the second global feature projection map $K_g(F_{i2})$, and $L_d$ represents a pixel-level loss value obtained by comparing the first pixel-level feature projection map $Q_d(F_{i1})$ and the second pixel-level feature projection map $K_d(F_{i2})$, $L_r$ represents a line-level loss value obtained by comparing the first line-level feature projection map $Q_r(F_{i1})$ and the second line-level feature projection map $K_r(F_{i2})$, $\alpha$ represents a loss weight coefficient of the pixel-level loss value, $\beta$ represents a loss weight coefficient of the line-level loss value.

In a possible implementation manner of the first aspect, after the image sample set is obtained and taken as the training sample set, the method further includes a step of performing a data augmentation on the training sample set according to a generative adversarial network to obtain a new training sample set.

In a possible implementation manner of the first aspect, the preprocessing includes at least one of a background noise removal, a filtering, a zero-time correction and an amplitude gain.

In a possible implementation manner of the first aspect, an aspect ratio of the ground-penetrating radar grayscale image is a preset ratio.

In a possible implementation manner of the first aspect, the preset ratio is 1:1.

In accordance with a second aspect, an embodiment of the present application provides a device for a quality detection of tunnel lining through ground-penetrating radar based on self-supervised learning, including: an acquisition module, an input module and an output module.

The acquisition module is configured to obtain a ground-penetrating radar grayscale image.

The input module is configured to input the ground-penetrating radar grayscale image into a trained convolutional neural network model to recognize the quality detection of tunnel lining. The convolutional neural network model is constructed according to a learned feature extraction network, the feature extraction network is obtained by means of self-supervised contrastive learning according to a training sample set, and each image sample in the training sample set is an image of unlabeled image-sample label.

The output module is configured to output a recognition result of the quality detection of tunnel lining.

In a possible implementation of the second aspect, the device for the quality detection of tunnel lining through ground-penetrating radar based on self-supervised learning also includes a training module.

In accordance with a third aspect, an embodiment of the present application provides a server, including a memory, a processor, and a computer program stored in the memory and executable by the processor, and steps performed by the processor include:

obtaining a ground-penetrating radar grayscale image;

inputting the ground-penetrating radar grayscale image into a trained convolutional neural network model to recognize the quality detection of tunnel lining, wherein the convolutional neural network model is constructed according to a learned feature extraction network, and the feature extraction network is obtained by means of self-supervised contrastive learning according to a training sample set, and each image sample in the training sample set is an image of unlabeled image-sample label; and outputting a recognition result of the quality detection of tunnel lining.

In a possible implementation manner of the third aspect, the steps performed by the processor also include:

obtaining an image sample set, and taking the image sample set as the training sample set;

constructing a self-supervised learning pre-training network, performing the self-supervised contrastive learning on the self-supervised learning pre-training network according to the training sample set, to generate the learned feature extraction network;

constructing the convolutional neural network model according to the learned feature extraction network;

obtaining downstream training samples having labeled data; and performing a supervised learning on the convolutional neural network model by using the downstream training samples having labeled data, to obtain the trained convolutional neural network model.

In a possible implementation manner of the third aspect, the steps executed by the processor specifically include:

constructing the self-supervised learning pre-training network, where the self-supervised learning pre-training network includes an online encoder, a momentum encoder and a loss calculation model;

performing a transformation process on each image sample respectively, to obtain a first view $V_{i1}$ and a second view $V_{i2}$ corresponding to the image sample;

inputting the first view $V_{i1}$ corresponding to the image sample into the online encoder respectively, to obtain a first projection feature atlas corresponding to the image samples;

inputting the second view $V_{i2}$ corresponding to the image sample into the momentum encoder respectively, to obtain a second projection feature atlas corresponding to the image samples;

obtaining a feature extraction network model by training according to the loss calculation model, the obtained first projection feature atlas corresponding to the image sample, and the obtained second projection feature atlas corresponding to the image sample.

In accordance with a fourth aspect, an embodiment of the present application provides a computer-readable storage medium, in which a computer program is stored, and when the computer program is executed by a processor, the method for the quality detection of tunnel lining through ground-penetrating radar based on self-supervised learning as described in the first aspect is implemented.

In accordance with a fifth aspect, an embodiment of the present application provides a computer program product, including a computer program, when the computer program is executed by a processor, the method for the quality detection of tunnel lining through ground-penetrating radar based on self-supervised learning as described in the first aspect is implemented.

The present application relates to an intelligent automatic recognition technology for quality detection data of a ground-penetrating radar tunnel lining structure, in particular to a method for deep neural network training based on a large amount of unlabeled data by means of the artificial intelligence self-supervised contrastive learning technology, which can save the high time cost caused by manual labeling of a large number of ground-penetrating radar detection data, and can greatly improve the efficiency of the ground-penetrating radar artificial intelligence automatic recognition technology. Meanwhile, due to an increase in the number of training samples to be used, the recognition accuracy of the method provided by the present application is significantly improved compared with the conventional artificial intelligence recognition methods.

DETAILED DESCRIPTION OF EMBODIMENTS

Figure 1:
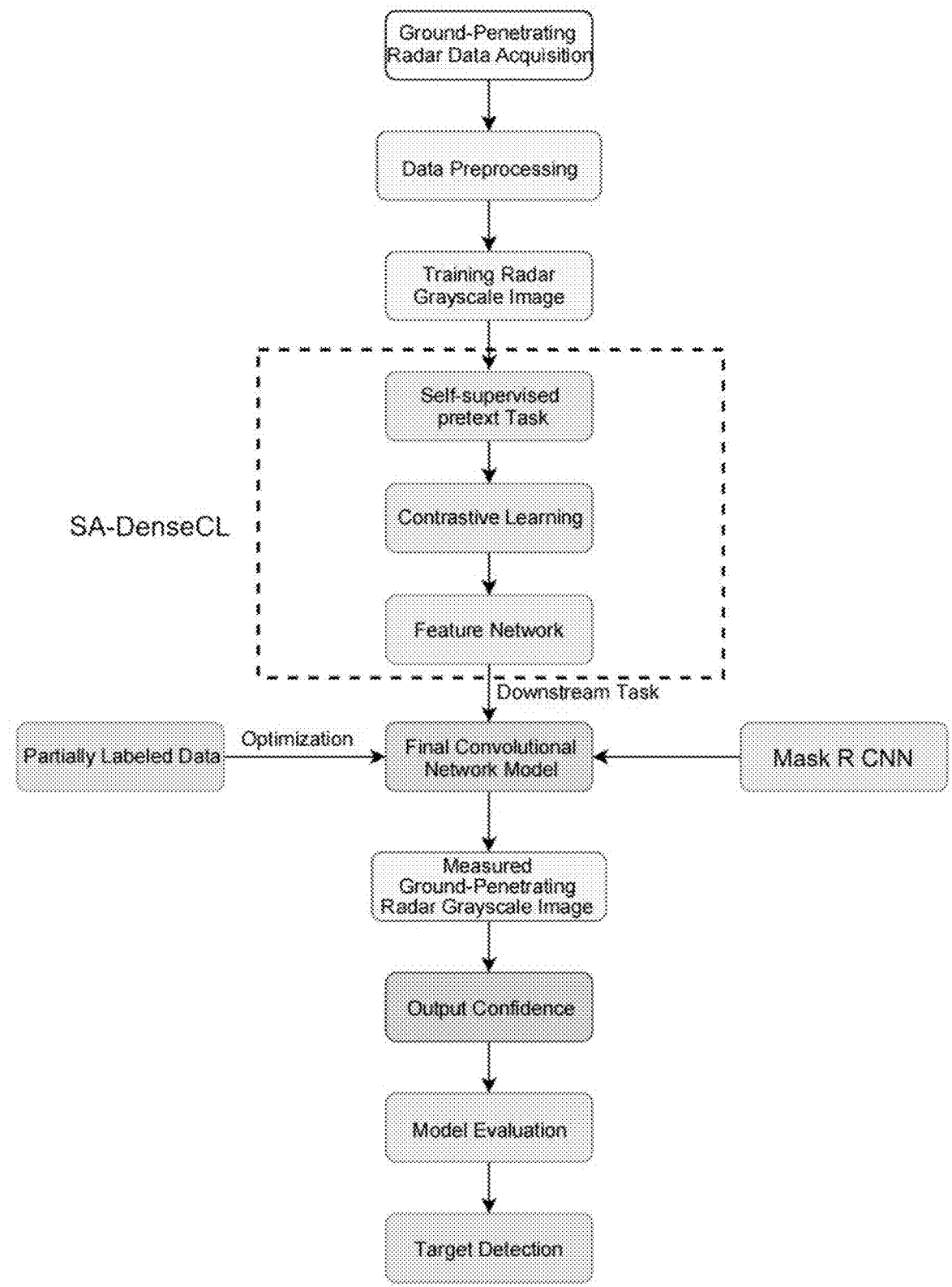
FIG. 1 is a schematic flow chart of a method for a quality detection of tunnel lining with a ground-penetrating radar based on self-supervised learning provided by the present application.

In order to make the problems to be solved, solutions and beneficial effects of the present application more clearly, the present application will be further described in detail below with reference to the drawings and embodiments. It should be understood that the specific embodiments described here are intended only to explain the present application, and are not intended to limit the present application.

The deep learning technology based on convolutional neural network is a supervised learning technology, and the recognition accuracy of deep learning technology depends entirely on the number of learning samples and the quality of labels. In the process of network training, it is necessary to manually label the ground radar detection images to make a training sample set. Due to the high time cost of manual labeling, the efficiency and accuracy of the model training are low. In response to these problems, the present application applies a large amount of unlabeled data for deep neural network training by means of artificial intelligence self-supervised contrastive learning technology, which can not only save the time cost of manual labeling, but also improve the efficiency of ground-penetrating radar artificial intelligence automatic recognition technology.

The present application relates to an intelligent automatic recognition technology for quality detection data of a ground-penetrating radar tunnel lining structure, in particular to a method for deep neural network training based on a large amount of unlabeled data by means of the artificial intelligence self-supervised contrastive learning technology, which can save the high time cost caused by manual labeling of a large number of ground-penetrating radar detection data, and can greatly improve the efficiency of the ground-penetrating radar artificial intelligence automatic recognition technology. Meanwhile, due to an increase in the number of training samples to be used, the recognition accuracy of the method provided in the present application is significantly improved compared with the conventional artificial intelligence recognition methods.

To be specific: it is difficult to obtain a large amount of real tunnel lining internal data containing defect signals based on ground-penetrating radar detection and difficult to label, and the deep learning model trained by ground-penetrating radar data generated by simulation or GAN is difficult to deal with real tunnel lining internal GRP data. Thus, it is difficult for the current deep learning method to be applied in the tunnel lining internal detection project.

According to characteristics of ground-penetrating radar data, the present application provides a self-supervised learning algorithm based on contrast constraints, self-attention for dense contrastive learning (SA-DenseCL), which can be used for internal detection of tunnel lining.

The main idea of the present application is that:
1) Firstly, a large number of unlabeled real GPR data is applied to pre-train the self-supervised learning pre-training network to obtain a feature extraction network (backbone);
2) The extracted feature extraction network (backbone) is constructed into a convolutional neural network model, and finally a small amount of labeled GPR data is applied to fine-tune the convolutional neural network model, to obtain a trained convolutional neural network model.

Experimental results show that when a limited and equal number of annotated tunnel lining GRP images are used for fine-tuning, the pre-training method successfully improves the detection performance of the convolutional neural network model for real tunnel lining internal GRP data. Among them, an average precision (AP) of steel bars reaches 0.96703, increased by 1.171%, the AP of void defects reaches 0.81043, increased by 8.494%, and the AP of the secondary lining division (thickness) reaches 0.94665, increased by 3.438%. Results of the model test are verified by performing a tunnel opening at the tunnel site, and the results show that the method can be successfully applied in the project for an internal quality detection of actual tunnel lining.

Referring to FIG. 1, the present application provides a method for a quality detection of tunnel lining through ground-penetrating radar based on self-supervised learning, which includes the following steps.

In step 1, an image sample set is prepared and obtained.

Each image sample in the image sample set is obtained in the following manner:

In step 1.1, a tunnel lining structure is detected through ground-penetrating radar equipment in a 2-dimensional or 3-dimensional array, to obtain raw data of a ground-penetrating radar measurement.

In step 1.2, the raw data of the ground-penetrating radar measurement is processed to obtain pre-processed data of the ground-penetrating radar measurement.

In step 1.3, the preprocessed data of the ground-penetrating radar measurement is processed to obtain a GPR grayscale image, and the GPR grayscale image is taken as the image sample.

In step 2, the image sample set is taken as a training sample set; where, each image sample in the training sample set does not need to be marked with an image-sample label.

In step 3, a self-supervised learning task is constructed, and the self-supervised contrastive learning is performed by using the training sample set, to generate a learned feature extraction network.

Figure 2:
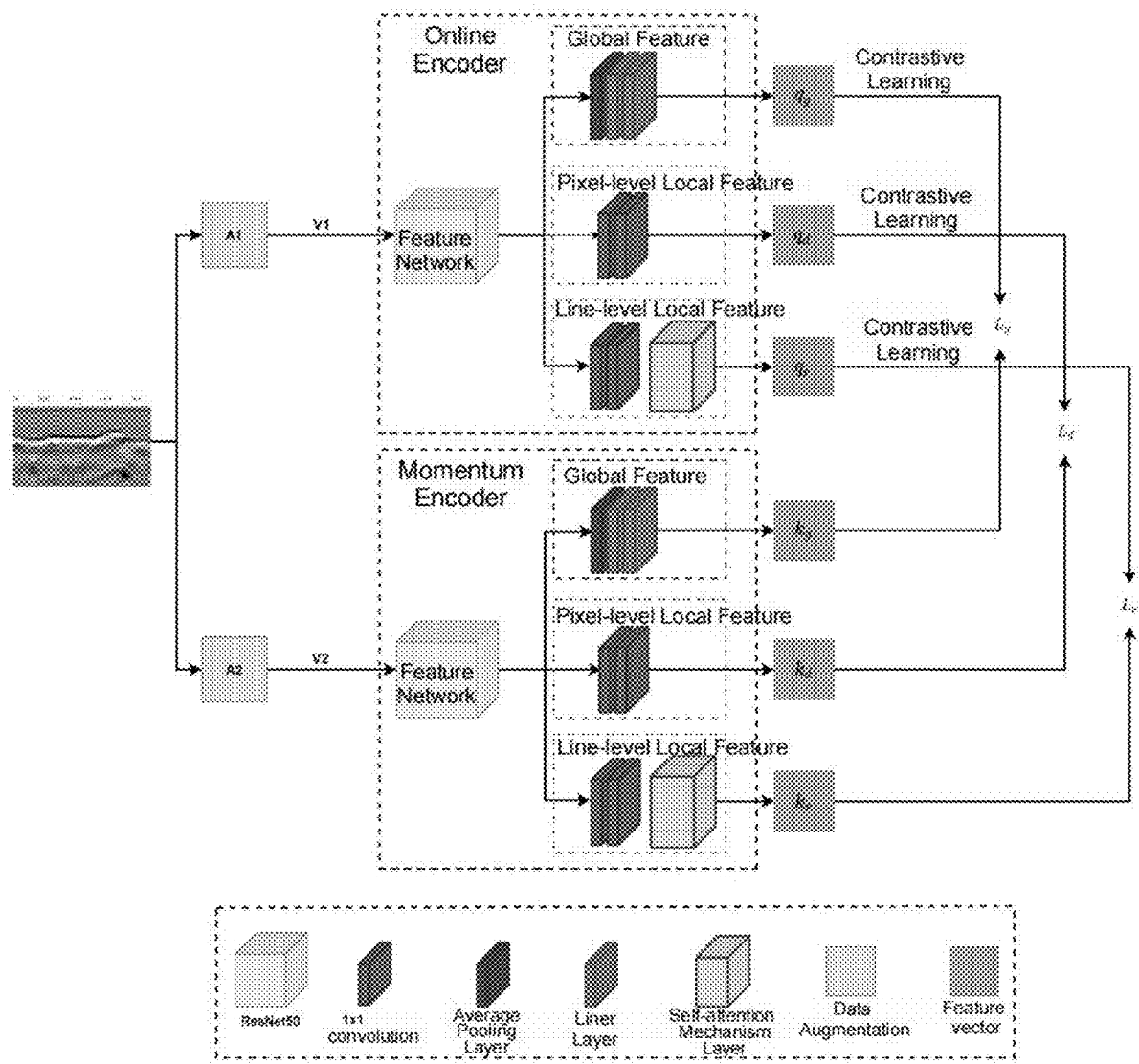
FIG. 2 is a schematic diagram of a pre-training network based on self-supervised learning provided by the present application.

The step 3 specifically includes the following steps:

In step 3.1, a self-supervised learning pre-training network is constructed; the self-supervised learning pre-training network includes an online encoder, a momentum encoder and a loss calculation model, as shown in FIG. 2.

A structure of the online encoder is exactly the same as that of the momentum encoder. The online encoder includes a first backbone network backbone (1), a first global feature projection model, a first pixel-level local feature projection model and a first line-level local feature projection model. The momentum encoder includes a second backbone network backbone (2), a second global feature projection model, a second pixel-level local feature projection model, and a second line-level local feature projection model.

In this step, the global feature projection model is to perform a projection on an overall feature of a feature map after a feature extraction via the backbone network. The size of the feature map output by the backbone is 7×7. After being down-sampled by an adaptive average pooling layer, the size of the feature map becomes 1×1, and then the feature map enters two linear layers for dimension reduction. ReLU( ) is used as an activation function between the two linear layers, and finally, a feature vector with a dimension of 128 is output.

The pixel-level local feature projection model: which is configured to project pixel-level local features of the feature map after a feature extraction via the backbone network. After two 1×1 conv layers, the feature map is then divided into 49 unit-sized 128-dimensional feature vectors to achieve pixel-level feature comparison learning.

The line-level local feature projection model: which is configured to project feature correlation information between local positions of the ground-penetrating radar image. When projecting, the line formed by a row of pixels is used as a projection unit for projection.

In step 3.2, n image samples in the training sample set are input to the self-supervised learning pre-training network, which are respectively represented as: an image sample $P_1$, an image sample $P_2$, ..., an image sample $P_n$, where each image sample is an unlabeled grayscale image.

For any image sample $P_i$, i=1, 2, ..., n, the following operations are performed:

In step 3.2.1, a transform process is performed on the image sample $P_i$ through two random data enhancement approaches to generate a view $V_{i1}$ and a view $V_{i2}$;

Among them, the data enhancement approach includes: a random cropping, a random flipping, a contrast adjustment, a saturation adjustment, a Gaussian blur and a solarization operation.

In step 3.2.2, the view $V_{i1}$ is input into the online encoder, and the following operations are performed.

The first backbone network backbone (1) performs the feature extraction on the view $V_{i1}$ to obtain a feature map $F_{i1}$, and the feature map $F_{i1}$ is taken as a first feature map $F_{i1}$.

The feature map $F_{i1}$ is respectively input into the first global feature projection model, the first pixel-level local feature projection model, and the first line-level local feature projection model. The first global feature projection model is configures to perform a global feature projection on the feature map $F_{i1}$, to obtain a global feature projection map $Q_g(F_{i1})$. The first pixel-level local feature projection model is configured to perform a pixel-level local feature projection on the feature map Fi1, to obtain a pixel-level feature projection map $Q_d(F_{i1})$. The first line-level local projection model is configured to perform a line-level local feature projection on the feature map Fi1 through, to obtain a line-level feature projection map $Q_r(F_{i1})$.

Specifically, the first feature map $F_{i1}$ is input into the first global feature projection model to obtain a first global feature projection map $Q_g(F_{i1})$. The first feature map $F_{i1}$ is input into the first pixel-level local feature projection model for the pixel-level local feature projection to obtain a first pixel-level feature projection map $Q_d(F_{i1})$. The first feature map $F_{i1}$ is input into the first line-level local feature projection model for the line-level local feature projection to obtain a first line-level feature projection map $Q_r(F_{i1})$. The first global feature projection map $Q_g(F_{i1})$, the first pixel-level feature projection map $Q_d(F_{i1})$, and the first line-level feature projection map $Q_r(F_{i1})$ are taken as a first projection feature atlas corresponding to each image sample.

The view $V_{i2}$ is input into the momentum encoder, and the following operations are performed.

The second backbone network backbone (2) performs the feature extraction on the view $V_{i2}$ to obtain a feature map $F_{i2}$, and the feature map $F_{i2}$ is taken as a second feature map $F_{i2}$.

The feature map $F_{i2}$ is respectively input into the second global feature projection model, the second pixel-level local feature projection model, and the second line-level local feature projection model. The second global feature projection model is configured to perform a global feature projection on the feature map $F_{i2}$ through t1, to obtain a global feature projection map $K_g(F_{i2})$. The second pixel-level local feature projection model is configured to perform a pixel-level local feature projection on the feature map $F_{i2}$, to obtain a pixel-level feature projection map $K_d(F_{i2})$. The second line-level local feature projection model is configured to perform a line-level local feature projection on the feature map $F_{i2}$, to obtain a line-level feature projection map $K_r(F_{i2})$.

Specifically, the second feature map $F_{i2}$ is input to the second global feature projection model to obtain a second global feature projection map $K_g(F_{i2})$. The second feature map $F_{i2}$ is input to the second pixel-level local feature projection model for the pixel-level local feature projection to obtain a second pixel-level feature projection map $K_d(F_{i2})$. The second feature map $F_{i2}$ is input to the second line-level local feature projection model for the line-level local feature projection to obtain a second line-level feature projection map $K_r(F_{i2})$. The second global feature projection map $K_g(F_{i2})$, the second pixel-level feature projection map $K_d(F_{i2})$, and the second line-level feature projection map $K_r(F_{i2})$ are taken as a second projection feature map set corresponding to each image sample.

In this step: the line-level local feature projection is performed on the feature map $F_{i1}$ through the first line-level local feature projection model to obtain the line-level feature projection map $Q_r(F_{i1})$, specifically, the line-level feature projection map $Q_r(F_{i1})$ is the first line-level feature projection map $Q_r(F_{i1})$.

Specifically:
1) Three linear layers are configured, namely, a first linear feature extraction layer, a second linear feature extraction layer and a third linear feature extraction layer.
2) The feature map $F_{i1}$ is divided into three linear regions, namely, a first linear region, a second linear region and a third linear region.

The feature map $F_{i1}$ is respectively input to the first linear feature extraction layer, the second linear feature extraction layer and the third linear feature extraction layer;

The first linear feature extraction layer is configured to perform a feature extraction on the first linear region to obtain a feature vector B1.

The second linear feature extraction layer is configured to perform a feature extraction on the second linear region to obtain a feature vector B2.

The third linear feature extraction layer is configured to perform a feature extraction on the third linear region to obtain a feature vector B3.

3) a similarity Sim (B1, B2) between the feature vector B1 and the feature vector B2 is calculated.
4) the similarity Sim (B1, B2) is multiplied by the feature vector B3 to obtain an output vector, that is the line-level feature projection map $Q_r(F_{i1})$.

In step 3.2.3, the following formula is applied in a loss calculation model to calculate a loss value:

$$L = (1 - \alpha - \beta)L_g + \alpha L_d + \beta L_r$$

In this formula: L represents an overall loss value; $L_g$ represents a global loss value obtained by comparing the global feature projection map $Q_g(F_{i1})$ with the global feature projection map $K_g(F_{i2})$; $L_d$ represents a pixel-level loss value obtained by comparing the pixel-level feature projection map $Q_d(F_{i1})$ with the pixel-level feature projection map $K_d(F_{i2})$; $L_r$ represents a line-level loss value obtained by comparing the line-level feature projection map $Q_r(F_{i1})$ and the line-level feature projection map $K_r(F_{i2})$; $\alpha$ represents a loss weight coefficient of the pixel-level loss value; and $\beta$ represents a loss weight coefficient of the line-level loss value.

Taking the global loss value $L_g$ as an example, a calculation approach is that:

The global feature projection map $Q_g(F_{i1})$ is used as a query q, and q is derived from the feature representation of different views of a same original GPR image. That is: the global feature projection map $K_g(F_{i2})$ is referred to as a positive key $k^+$, and the other feature representations from different raw GPR images are considered as $k^-$.

Therefore, for each query q, there is a set of encoded keys {k0, k1, k2 . . . }, but only one corresponding positive key $k^+$ forms a pair of positive samples with the query q, and the remaining $k^-$ forms many pairs of negative samples with the query q. A convergence direction of network training is to keep q close to $k^+$ and away from all other $k^-$. Based on this principle, a calculation formula for obtaining the loss function value is constructed.

In step 3.2.4, according to the overall loss value L, the parameter update value $\theta_1$ of the first backbone network backbone (1) is obtained by means of gradient update parameter.

The following formula is adopted to obtain a parameter update value $\theta'_2$ of the second backbone network backbone (2).

$$\theta_2 \leftarrow m\theta'_2 + (1 - m)\theta_1$$

In this formula: m represents an update coefficient; and $\theta'_2$ represents a current parameter value of the second backbone network backbone (2) that is not updated.

In step 3.3, the first backbone network backbone (1) and the second backbone network backbone (2) are updated; and the next batch of image samples are used to continue training until convergence. the first backbone network backbone (1), after training, is extracted as the feature extraction network after learning. Therefore, in the process of repeated iterations, the loss function continues to converge, and the backbone continuously updates parameters to learn feature extraction capabilities.

In this step, through self-supervised learning pre-training network, in the absence of large-scale labeled data, the backbone network backbone is enabled to learn high-quality features only by pre-training a large amount of unlabeled data. Contrastive learning is that: a pretext task, as the convergence target of model training, is constructed by encoding based on learning the similarity or dissimilarity of two views.

After the pre-training is finished, the backbone is extracted, and a fine-tuning training is performed according to different downstream tasks by using the corresponding label data, that is, a step 4 is performed.

In step 4, a convolutional neural network model is constructed based on the learned feature extraction network.

A downstream training sample having labeled data is is processed and obtained; and a supervised learning is performed on the convolutional neural network model by using the downstream training sample having labeled data, to obtain a trained convolutional neural network model.

In step 5: the ground-penetrating radar grayscale image is obtained through actual measurement; the ground-penetrating radar grayscale image is input into the trained convolutional neural network model to enable a recognition for the quality detection of tunnel lining, and output a recognition result of the quality detection of tunnel lining.

Considering the particularity of the ground-penetrating radar data itself, each ground-penetrating radar image is composed of A-Scans having similar sequence signals, and there is strong correlation information between neighboring A-Scans. The present application utilizes a contrastive learning mode to strengthen the learning of the correlation information between the features of the neighboring A-Scans in the ground-penetrating radar image, and to promote the feature extraction network to extract more comprehensive and accurate information on features of the ground-penetrating radar image. The main concept of the present application is that: firstly, a large number of unlabeled real tunnel lining GPR data are used for self-supervised learning pre-training, then a backbone with stronger feature extraction capabilities is extracted, and then based on a transfer learning, the extracted backbone parameters initialize a detection model, and finally a small amount of labeled data is utilized to fine-tune the model.

The present application has the following advantages that: throughout the training process, whether it is a pre-training or a fine-tuning, the training data used in the present application all come from actual tunnels without a need to mix any simulated data or other irrelevant data sets. Thus, the performance of the model trained in the present application will be more powerful in actual detection data. In view of the shortage of label data, when the same amount of data and labels are used in the fine-tuning stage, the average precision of steel bar detection, the average precision of void detection and the average precision of secondary lining thickness detection are all significantly improved.

An embodiment is introduced below:

1. The input ground-penetrating radar detection data is routinely preprocessed, including a background noise removal, a DEWOW filtering, a zero-time correction and an amplitude gain, etc.

2. A grayscale image in B-scan (two-dimensional) or C-scan (three-dimensional) of the measurement data is prepared according to the needs of the artificial intelligence training model data set. The grayscale image is generally obtained by weighting and averaging the three components with different weights according to the RGB image of the measurement data:

$$GrayScale = 0.299 \times R + 0.587 \times G + 0.114 \times B \quad (1)$$

Figure 3:
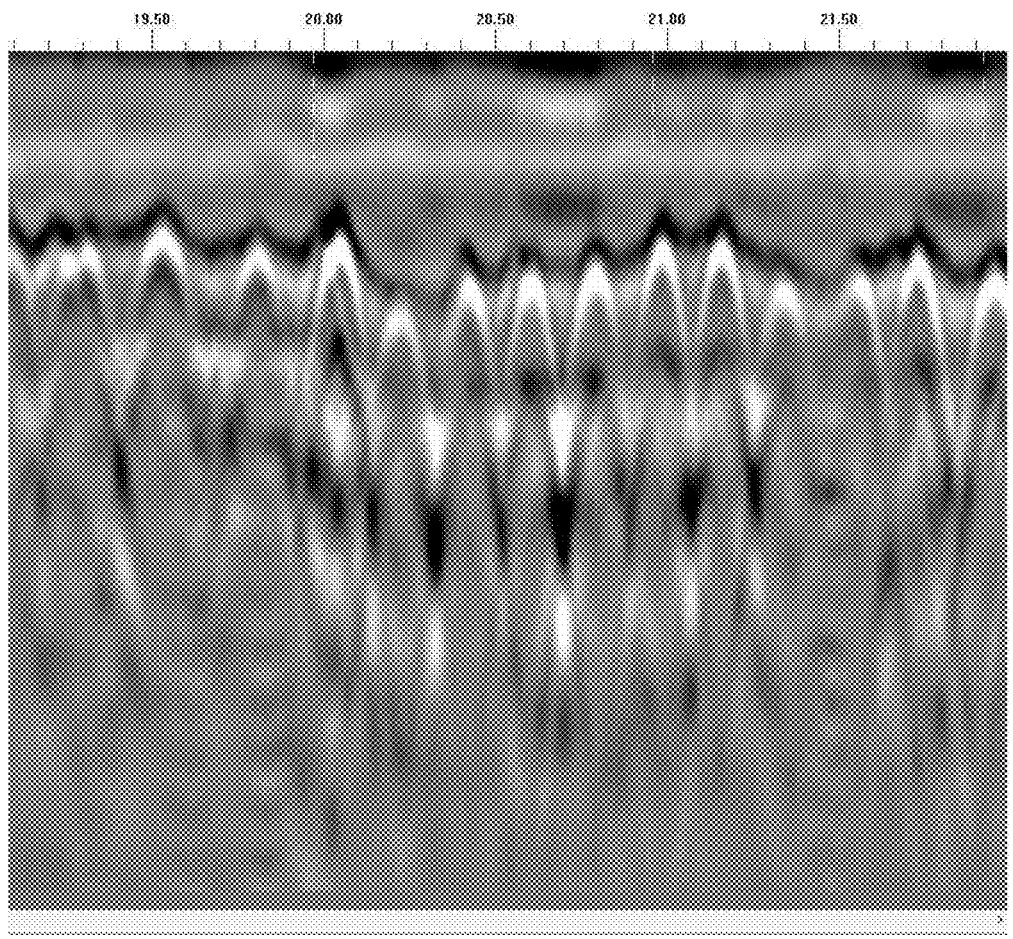
FIG. 3 is a grayscale image of ground-penetrating radar measurement data.

In addition, in order not to distort the information during the training process, the aspect ratio of the grayscale image of the GPR measurement data should be as close to 1:1 as possible. The schematic diagram is shown in FIG. 3, which is an example of the grayscale image of the GPR measurement data.

3. The generative adversarial network is adopted to augment the current training set.

A progressive growing of generative adversarial network PGGAN (Progressive growing of GAN) is adopted in the present application.

Characterized in that, images of specified resolution size can be output by using a progressive weighting calculation, and appropriate batch size for different scales can be set to shorten the training time. The use of generative adversarial network can greatly increase the amount of data in the training set, and the generated data does not require manual labeling, which is very suitable for the method provided in the present application.

4. A self-supervised pretext task is constructed, and the prepared training data set is used for the self-supervised contrastive learning, to obtain the backbone network.

A goal of the self-supervised contrastive learning is to train a model such that similar samples have similar representations, i.e., the similarity of two projections of the same input x is maximized, while minimizing the similarity of projections of other images within the same minibatch.

5. The backbone network obtained in the above steps is input to a downstream task, and a final convolutional network model is obtained through further training of the downstream task.

The downstream task here refers to a target detection in the GPR lining structure. There may be many types of targets, which are determined by the purpose of detection. The downstream detection task is a supervised learning task, which needs to input a certain amount of labeled data. It should be noted that the amount of data that needs to be labeled here is almost negligible compared with the conventional artificial intelligence recognition.

6. The final convolutional network model trained in the above steps is applied to the actual measurement data to complete the automatic recognition of the target object in the tunnel lining structure. According to the recognition results, the quality and health state f a lining concrete structure of the detected tunnel can be evaluated.

Figure 4:
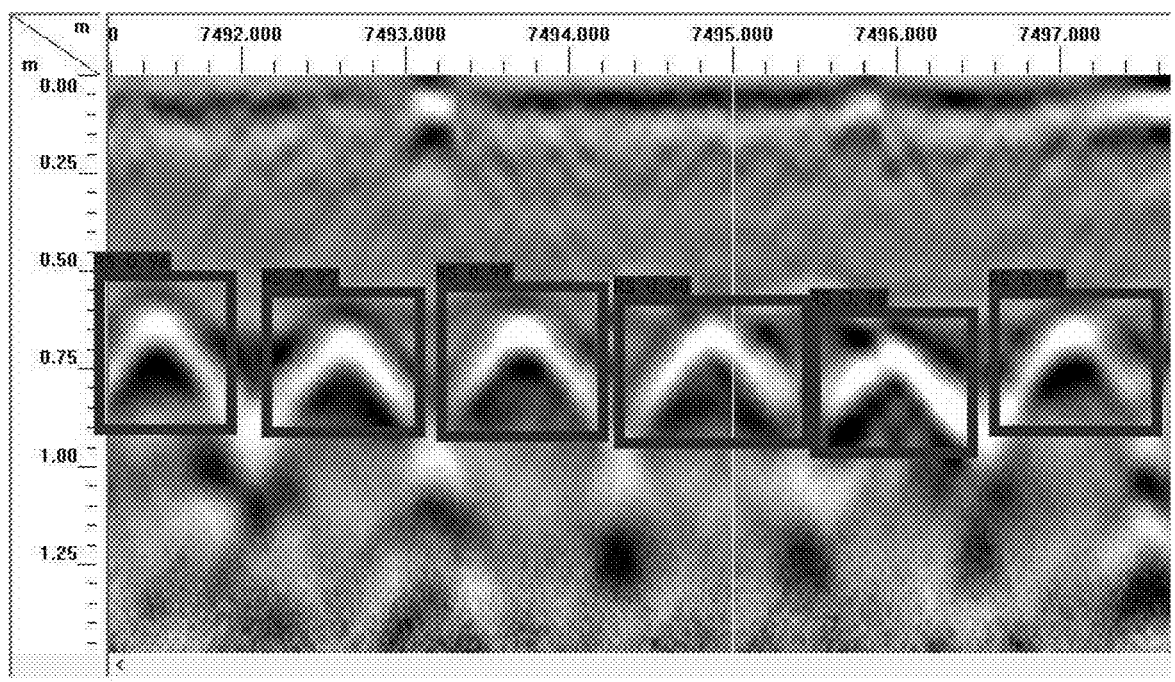
FIG. 4 is a diagram of a recognition result of steel arches.
Figure 5:
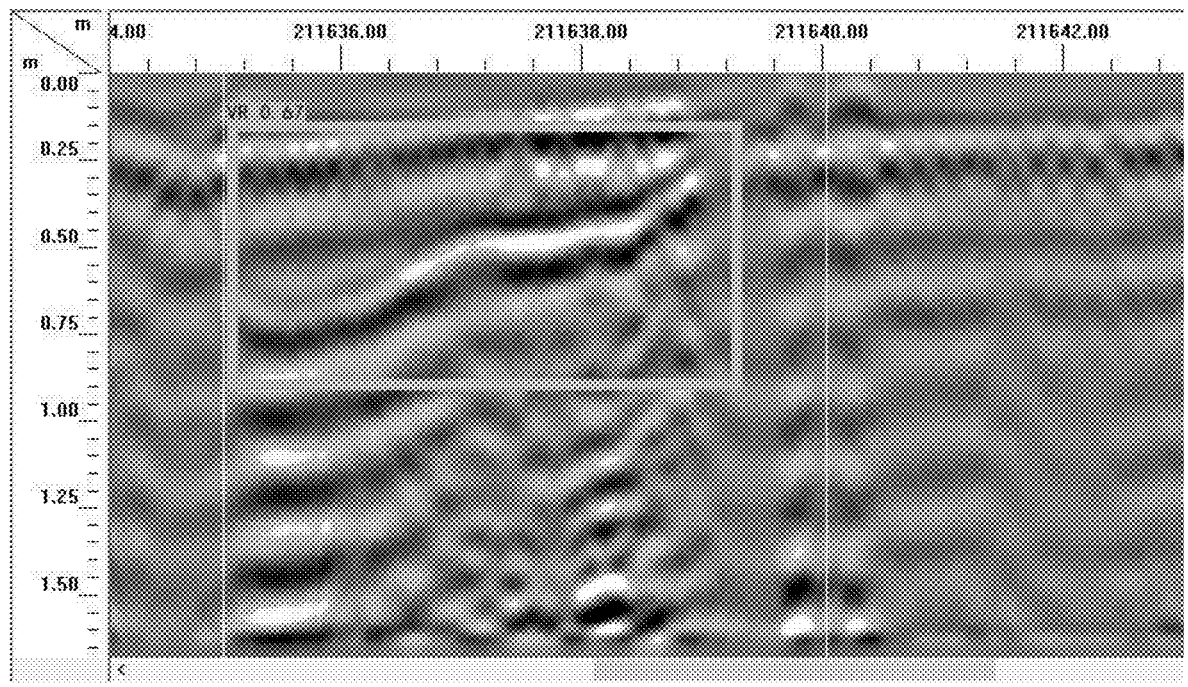
FIG. 5 is a diagram of a recognition result of voids.

Taking merely steel arches and voids as examples, the recognition results are shown in FIGS. 4 and 5, where FIG. 9 shows the recognition results of steel arches and FIG. 5 shows the recognition results of voids.

Figure 6:
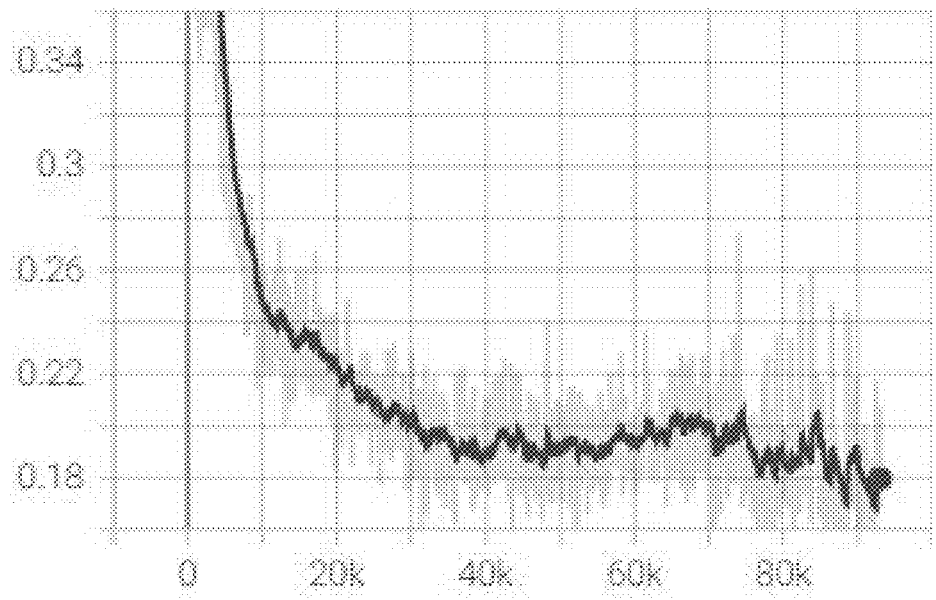
FIG. 6 shows a curve of self-supervised training loss.

Verification Example 11,000 unlabeled GPR grayscale images are prepared and collected as a self-supervised training set. 1,600 labeled grayscale images are prepared as a supervised learning training set. The curve of self-supervised training loss is shown in FIG. 6.

Figure 7:
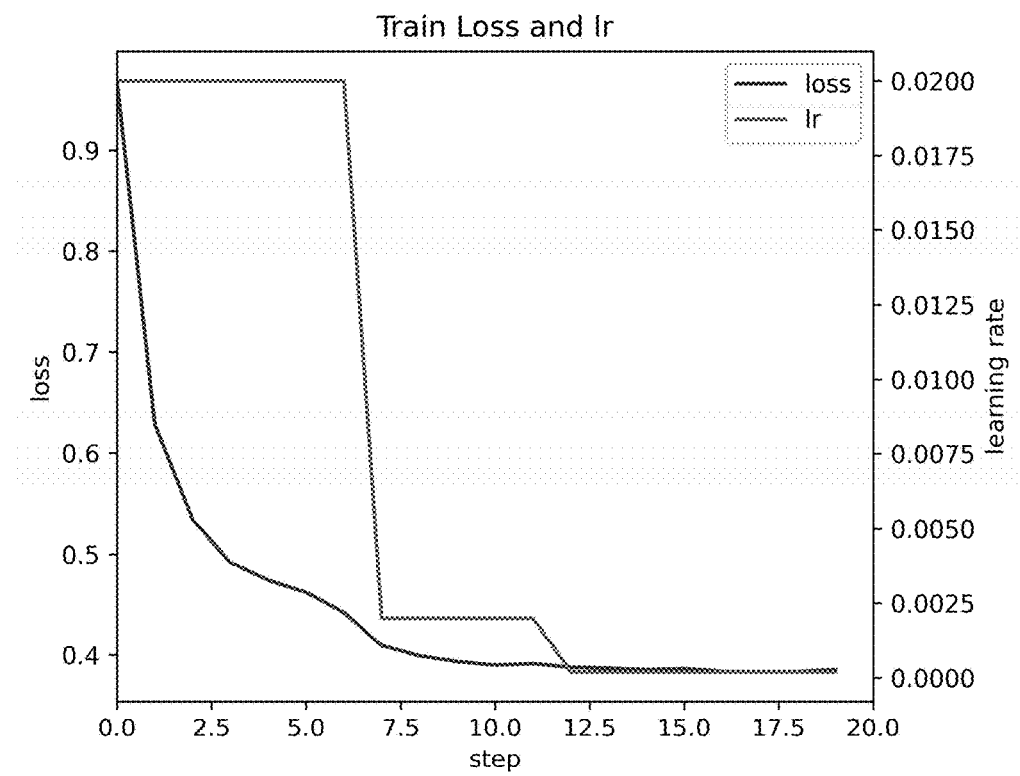
FIG. 7 shows curves of downstream task learning rate (lr) and loss function (loss)
Figure 8:
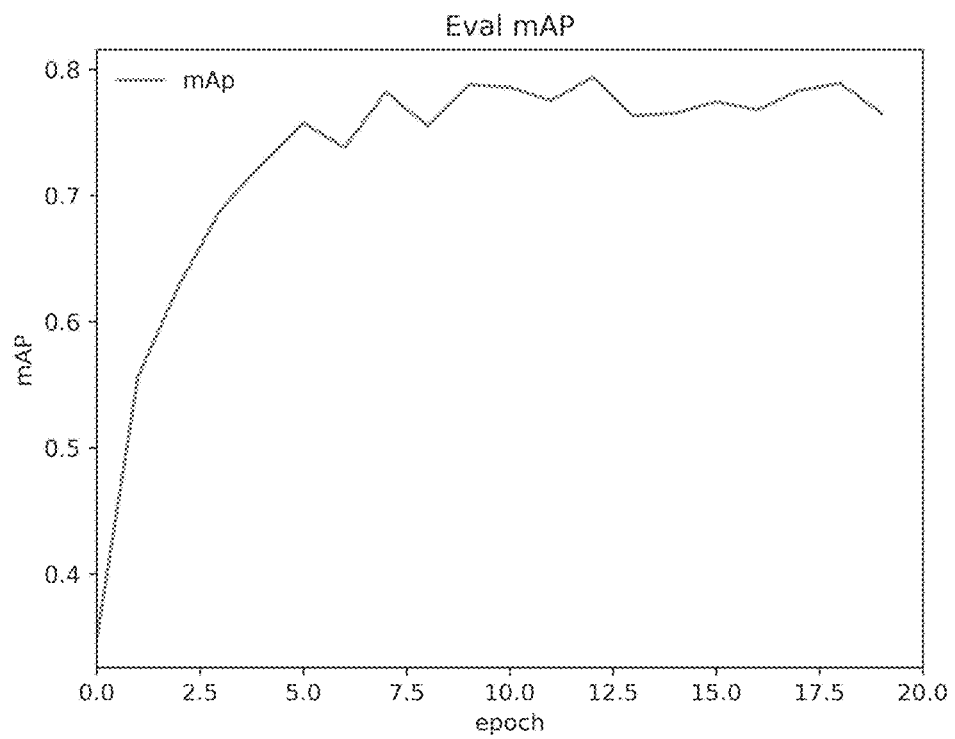
FIG. 8 shows a curve of average recognition accuracy.

The curves of downstream task learning rate (lr) and loss function (loss) are shown in FIG. 7. The curve of average recognition accuracy (steel bars, voids) is shown in FIG. 8.

The method of the present application, compared with the conventional artificial intelligence recognition method (see the table below), has a significantly increased recognition accuracy, which proves the effectiveness of the method of the present application.

| Algorithm | Data | Accuracy rate of reinforcement | Accuracy rate of voids | Accuracy rate of thickness |
|---|---|---|---|---|
| conventional artificial intelligence recognition | 1,600 labeled | 96.04% | 90.55% | 91.23% |
| Method of the present application | 11,000 unlabeled + 1,600 labeled | 96.89% | 92.96% | 94.67% |

The present application has the following advantages:

1. The present application provides a method for intelligent automatic recognition of GPR tunnel lining detection data based on a self-supervised contrastive learning technology.

2. The recognition method provided by the present application can apply a large amount of unlabeled data for deep neural network training, saving the high time cost caused by manual labeling of a large amount of ground-penetrating radar detection data, and greatly improving the efficiency of the artificial intelligence automatic recognition technology of ground-penetrating radar.

3. The self-supervised contrastive learning provided by the present application can increase the utilization rate of current data, and a large amount of detection data can be directly applied to the training of artificial intelligence. This process can also realize the automatic generation of training sample database by means of computer processing. Therefore, the amount of data in the training sample database can increase geometrically compared with the conventional ground-penetrating radar artificial intelligence sample database.

4. Due to the increase in the amount of the used data, the accuracy of artificial intelligence automatic recognition has been significantly improved compared with conventional ground-penetrating radar automatic recognition.

The foregoing embodiments are merely intended to illustrate the solutions of the present application rather than being intended to limit the present application. Although the present application has been described in detail with reference to the foregoing embodiments, those of ordinary skills in the art should understand that it is still possible to modify the solutions described in the above embodiments or to make equivalent substitutions of some of the features in the embodiments; and that these modifications or substitutions shall all be included within the protection scope of the present application.

What is claimed is:

1. A self-supervised learning-based method for recognition of tunnel lining quality detection using ground-penetrating radar, comprising:
   obtaining a ground-penetrating radar grayscale image;
   inputting the ground-penetrating radar grayscale image into a trained convolutional neural network model to perform recognition of tunnel lining quality detection, wherein a convolutional neural network model is constructed according to a learned feature extraction network, and a feature extraction network is obtained by means of self-supervised contrastive learning according to a training sample set, and each image sample in the training sample set is an unlabeled image sample; and
   outputting a tunnel lining quality detection recognition result.

2. The self-supervised learning-based method for recognition of tunnel lining quality detection using ground-penetrating radar as claimed in claim 1, further comprising:
   obtaining an image sample set, and taking the image sample set as the training sample set;
   constructing a self-supervised learning pre-training network, and performing the self-supervised contrastive learning on the self-supervised learning pre-training network according to the training sample set, to generate the learned feature extraction network;
   constructing the convolutional neural network model according to the learned feature extraction network;
   obtaining downstream training samples having labeled data; and
   performing, by using the downstream training samples having labeled data, a supervised learning on the convolutional neural network model, to obtain the trained convolutional neural network model.

3. The self-supervised learning-based method for recognition of tunnel lining quality detection using ground-penetrating radar as claimed in claim 2, wherein said obtaining the image sample set comprises:
   detecting a tunnel lining structure through ground-penetrating radar equipment, to obtain raw data of a ground-penetrating radar measurement;
   preprocessing the raw data of the ground-penetrating radar measurement to obtain preprocessed data of the ground-penetrating radar measurement;
   processing the preprocessed data of the ground-penetrating radar measurement to obtain a ground-penetrating radar grayscale image, and taking the obtained ground-penetrating radar grayscale image as an image sample; and
   obtaining the image sample set based on obtained at least one image sample.

4. The self-supervised learning-based method for recognition of tunnel lining quality detection using ground-penetrating radar according to claim 3, wherein the preprocessing comprises at least one of a background noise removal, a filtering, a zero-time correction and an amplitude gain.

5. The self-supervised learning-based method for recognition of tunnel lining quality detection using ground-penetrating radar as claimed in claim 2, wherein said constructing the self-supervised learning pre-training network, and performing the self-supervised contrastive learning on the self-supervised learning pre-training network according to the training sample set, to generate the learned feature extraction network, comprises:
   constructing the self-supervised learning pre-training network, wherein the self-supervised learning pre-training network comprises an online encoder, a momentum encoder and a loss calculation model;
   performing a transformation process on each image sample, respectively, to obtain a first view $V_{i1}$ and a second view $V_{i2}$ corresponding to the image sample;
   inputting the first view $V_{i1}$ corresponding to the image sample into the online encoder, respectively, to obtain a first projection feature atlas corresponding to the image sample;
   inputting the second view $V_{i2}$ corresponding to the image sample into the momentum encoder, respectively, to obtain a second projection feature atlas corresponding to the image sample; and
   obtaining a feature extraction network model by training according to the loss calculation model, the obtained first projection feature atlas corresponding to the image sample, and the obtained second projection feature atlas corresponding to the image sample.

6. The self-supervised learning-based method for recognition of tunnel lining quality detection using ground-penetrating radar as claimed in claim 5, wherein said obtaining the feature extraction network model by training according to the loss calculation model, the obtained first projection feature atlas corresponding to the image sample, and the obtained second projection feature atlas corresponding to the image sample, comprising:
   obtaining an overall loss value L according to the first projection feature atlas corresponding to the image sample, the second projection feature atlas corresponding to the image sample, and the loss calculation model;
   obtaining, based on the overall loss value L, a parameter update value $\theta_1$ of a first backbone network by means of a gradient update parameter;
   determining a parameter update value $\theta 2$ of a second backbone network according to a formula, $$\theta_2 \leftarrow m\theta'_2 + (1-m)\theta_1$$

wherein m is an update coefficient, and $\theta'_2$ is a parameter value when the second backbone network is not currently updated;

updating the first backbone network and the second backbone network;

continuing to perform training by using a next batch of image samples until the overall loss value L converges; and taking the first backbone network as the learned feature extraction network.

7. The self-supervised learning-based method for recognition of tunnel lining quality detection using ground-penetrating radar as claimed in claim 5, wherein the training sample set comprises an image sample $P_1$, an image sample $P_2$, ..., an image sample $P_n$, and all of the image sample $P_1$, the image sample $P_2$, ..., the image sample $P_n$ are all unlabeled grayscale images;

correspondingly, said performing the transformation process on each image sample respectively, to obtain the first view $V_{i1}$ and the second view $V_{i2}$ corresponding to the image sample comprises:

performing the transformation process on the image sample to obtain the first view $V_{i1}$ and the second view $V_{i2}$ of the image sample, and wherein the transformation process comprises a random cropping, a random flipping, a contrast adjustment, a saturation adjustment, a Gaussian blur and an insolation operation, wherein, i=1, 2, ..., n.

8. The self-supervised learning-based method for recognition of tunnel lining quality detection using ground-penetrating radar as claimed in claim 5, wherein the online encoder comprises a first backbone network, a first global feature projection model, a first pixel-level local feature projection model and a first line-level local feature projection model;

correspondingly, said inputting the first view $V_{i1}$ corresponding to the image sample into the online encoder respectively, to obtain the first projection feature atlas corresponding to the image sample comprises:

for the first view $V_{i1}$ of each image sample, performing a feature extraction on the first view $V_{i1}$ according to the first backbone network to obtain a first feature map $F_{i1}$;

inputting the first feature map $F_{i1}$ into the first global feature projection model to obtain a first global feature projection map $Q_g(F_{i1})$;

inputting the first feature map $F_{i1}$ into the first pixel-level local feature projection model for a pixel-level local feature projection, to obtain a first pixel-level feature projection map $Q_d(F_{i1})$;

inputting the first feature map $F_{i1}$ into the first line-level local feature projection model for a line-level local feature projection, to obtain a first line-level feature projection map $Q_r(F_{i1})$; and taking the first global feature projection map $Q_g(F_{i1})$, the first pixel-level feature projection map $Q_d(F_{i1})$, and the first line-level feature projection map $Q_r(F_{i1})$ as the first projection feature atlas corresponding to the image sample.

9. The self-supervised learning-based method for recognition of tunnel lining quality detection using ground-penetrating radar as claimed in claim 8, wherein the first line-level local feature projection model comprises a first linear feature extraction layer, a second linear feature extraction layer and a third linear feature extraction layer;

correspondingly, said inputting the first feature map $F_{i1}$ into the first line-level local feature projection model for the line-level local feature projection, to obtain the first line-level feature projection map $Q_r(F_{i1})$, comprises:

dividing the first feature map $F_{i1}$ into a first linear region, a second linear region and a third linear region;

performing a feature extraction on the first linear region according to the first linear feature extraction layer to obtain a first feature vector B1;

performing a feature extraction on the second linear region according to the second linear feature extraction layer to obtain a second feature vector B2;

performing a feature extraction on the third linear region according to the third linear feature extraction layer to obtain a third feature vector B3;

determining a vector similarity Sim (B1, B2) between the first feature vector B1 and the second feature vector B2; and taking a vector product between the vector similarity Sim (B1, B2) and the third feature vector B3 as the first line-level feature projection map $Q_r(F_{i1})$ of each first feature map $F_{i1}$.

10. The self-supervised learning-based method for recognition of tunnel lining quality detection using ground-penetrating radar as claimed in claim 5, wherein the momentum encoder comprises a second backbone network, a second global feature projection model, a second pixel-level local feature projection model and a second line-level local feature projection model;

correspondingly, said inputting the second view $V_{i2}$ corresponding to the image sample into the momentum encoder respectively, to obtain the second projection feature atlas corresponding to the image sample comprises:

for the second view $V_{i2}$ of each image sample, performing a feature extraction on the second view Vi2 according to the second backbone network to obtain a second feature map $F_{i2}$;

inputting the second feature map $F_{i2}$ into the second global feature projection model to obtain a second global feature projection map $K_g(F_{i2})$;

inputting the second feature map $F_{i2}$ into the second pixel-level local feature projection model for a pixel-level local feature projection to obtain a second pixel-level feature projection map $K_d(F_{i2})$;

inputting the second feature map $F_{i2}$ into the second line-level local feature projection model for a line-level local feature projection to obtain a second line-level feature projection map $K_r(F_{i2})$; and taking the second global feature projection map $K_g(F_{i2})$, the second pixel-level feature projection map $K_d(F_{i2})$, and the second line-level feature projection map $K_r(F_{i2})$ as the second projected feature atlas corresponding to the image sample.

11. The self-supervised learning-based method for recognition of tunnel lining quality detection using ground-penetrating radar as claimed in claim 5, wherein a calculation formula of the loss calculation model is:

$$L = (1-\alpha-\beta)L_g + \alpha L_d + \beta L_r$$

wherein, L represents an overall loss value, $L_g$ represents a global loss value obtained by comparing a first global feature projection map $Q_g(F_{i1})$ and a second global feature projection map $K_g(F_{i2})$, and $L_d$ represents a pixel-level loss value obtained by comparing a first pixel-level feature projection map $Q_d(F_{i1})$ and a second pixel-level feature projection map $K_d(F_{i2})$, $L_r$ represents a line-level loss value obtained by comparing a first line-level feature projection map $Q_r(F_{i1})$ and a second line-level feature projection map $K_r(F_{i2})$, $\alpha$ represents a loss weight coefficient of the pixel-level loss value, and $\beta$ represents a loss weight coefficient of the line-level loss value.

12. The self-supervised learning-based method for recognition of tunnel lining quality detection using ground-penetrating radar as claimed in claim 2, wherein after said obtaining an image sample set, and taking the image sample set as the training sample set, the self-supervised learning-based method for recognition of tunnel lining quality detection using ground-penetrating radar further comprises:
performing a data augmentation on the training sample set according to a generative adversarial network to obtain a new training sample set.

13. The self-supervised learning-based method for recognition of tunnel lining quality detection using ground-penetrating radar according to claim 1, wherein an aspect ratio of the ground-penetrating radar grayscale image is a preset ratio.

14. The self-supervised learning-based method for recognition of tunnel lining quality detection using ground-penetrating radar according to claim 13, wherein the preset ratio is 1:1.

15. A non-transitory computer-readable storage medium, in which a computer program is stored, wherein when the computer program is executed by a processor, the self-supervised learning-based method for recognition of tunnel lining quality detection using ground-penetrating radar according to claim 1 is implemented.

16. A server, comprising a memory, a processor, and a computer program stored in the memory and executable by the processor, wherein the computer program, when executed by the processor, causes the server to perform operations that comprise:
obtaining a ground-penetrating radar grayscale image;
inputting the ground-penetrating radar grayscale image into a trained convolutional neural network model to perform recognition of tunnel lining quality detection, wherein a convolutional neural network model is constructed according to a learned feature extraction network, and a feature extraction network is obtained by performing self-supervised contrastive learning according to a training sample set, and each image sample in the training sample set is an unlabeled image sample; and
outputting a tunnel lining quality detection recognition result.

17. The server according to claim 16, wherein the operations further comprise:
obtaining an image sample set, and taking the image sample set as the training sample set;
constructing a self-supervised learning pre-training network, performing the self-supervised contrastive learning on the self-supervised learning pre-training network according to the training sample set, to generate the learned feature extraction network;
constructing the convolutional neural network model according to the learned feature extraction network;
obtaining downstream training samples having labeled data; and
performing, by using the downstream training samples having labeled data, a supervised learning on the convolutional neural network model, to obtain the trained convolutional neural network model.

18. The server according to claim 16, wherein the operations further comprise:
constructing a self-supervised learning pre-training network, wherein the self-supervised learning pre-training network comprises an online encoder, a momentum encoder and a loss calculation model;
performing a transformation process on each image sample, respectively, to obtain a first view $V_{i1}$ and a second view $V_{i2}$ corresponding to the image sample;
inputting the first view $V_{i1}$ corresponding to the image sample into the online encoder, respectively, to obtain a first projection feature atlas corresponding to the image sample;
inputting the second view $V_{i2}$ corresponding to the image sample into the momentum encoder, respectively, to obtain a second projection feature atlas corresponding to the image sample;
obtaining a feature extraction network model by training according to the loss calculation model, the obtained first projection feature atlas corresponding to the image sample, and the obtained second projection feature atlas corresponding to the image sample.

* * * * *